(12) United States Patent
Womack

(10) Patent No.: US 10,575,681 B1
(45) Date of Patent: Mar. 3, 2020

(54) GRILL AND COOLER SYSTEM AND METHOD OF USE

(71) Applicant: Keith Womack, Hazelwood, MO (US)

(72) Inventor: Keith Womack, Hazelwood, MO (US)

( * ) Notice: Subject to any disclaimer, the term of this patent is extended or adjusted under 35 U.S.C. 154(b) by 0 days.

(21) Appl. No.: 16/196,299

(22) Filed: Nov. 20, 2018

(51) Int. Cl.
| | |
|---|---|
| *A47J 37/07* | (2006.01) |
| *F25D 3/08* | (2006.01) |
| *F25D 23/00* | (2006.01) |
| *B65D 81/38* | (2006.01) |
| *B62B 5/06* | (2006.01) |
| *B62B 5/00* | (2006.01) |
| *B62B 1/18* | (2006.01) |
| *B65D 25/28* | (2006.01) |

(52) U.S. Cl.
CPC ............ *A47J 37/0763* (2013.01); *B62B 1/18* (2013.01); *B62B 5/00* (2013.01); *B62B 5/06* (2013.01); *B65D 25/28* (2013.01); *B65D 81/3813* (2013.01); *F25D 3/08* (2013.01); *F25D 23/00* (2013.01); *B62B 2202/52* (2013.01)

(58) Field of Classification Search
CPC . B62B 1/262; B62B 3/02; B62B 3/102; A47J 2037/0777
USPC .............................. 280/47.34, 47.35; 126/50
See application file for complete search history.

(56) References Cited

U.S. PATENT DOCUMENTS

| | | | | |
|---|---|---|---|---|
| 5,100,198 A | * | 3/1992 | Baltzell | A47C 7/74 280/30 |
| 5,154,158 A | * | 10/1992 | Lindsey | A45C 11/20 126/25 R |
| 5,158,067 A | * | 10/1992 | Dutro | A47J 37/0713 126/39 R |
| 5,259,215 A | * | 11/1993 | Rocca | A45C 5/143 280/30 |
| 5,269,157 A | * | 12/1993 | Ciminelli | A45B 11/00 280/47.18 |
| 5,306,029 A | * | 4/1994 | Kaiser, II | A47B 31/02 108/80 |
| 5,380,022 A | * | 1/1995 | Dennis | A47B 5/02 280/47.35 |
| 5,407,218 A | * | 4/1995 | Jackson | A45C 5/14 280/30 |
| 5,480,170 A | * | 1/1996 | Kaiser, II | A47B 31/02 108/80 |
| 5,791,331 A | * | 8/1998 | Stewart | A47J 37/0704 126/25 R |
| 5,857,695 A | * | 1/1999 | Crowell | B62B 3/007 280/30 |
| 5,876,047 A | * | 3/1999 | Dennis | B62B 3/007 280/47.35 |
| 5,944,333 A | * | 8/1999 | Kent | B62B 1/10 280/204 |
| 5,957,145 A | * | 9/1999 | Plumer | E04H 12/2238 135/16 |

(Continued)

*Primary Examiner* — Jeffrey J Restifo
(74) *Attorney, Agent, or Firm* — Richard Eldredge

(57) ABSTRACT

A cooler system having a plurality of integral, insulated walls forming a partially enclosed inner cavity, a stand base attached to a bottom surface of the inner cavity, a lid configured to cover an opening to the inner cavity, and a lid aperture located in the lid configured to allow a pole inserted into the stand base such that a pole may be secured in the stand base and extend vertically through the lid aperture and support the attachment of a grill to the pole.

6 Claims, 2 Drawing Sheets

(56) References Cited

U.S. PATENT DOCUMENTS

| | | | | |
|---|---|---|---|---|
| 6,131,925 A * | 10/2000 | Weldon | B62B 1/12 | 280/30 |
| 6,176,499 B1 * | 1/2001 | Conrado | A45C 5/14 | 280/47.26 |
| 6,216,488 B1 * | 4/2001 | Rucker | A45B 11/00 | 62/331 |
| 6,374,839 B2 * | 4/2002 | Patarra | A45B 3/00 | 135/16 |
| 6,474,097 B2 * | 11/2002 | Treppedi | A45C 11/20 | 280/30 |
| 6,497,424 B2 * | 12/2002 | Gartner | B62B 5/082 | 280/47.4 |
| 6,520,513 B2 * | 2/2003 | Presley-Mays | A47C 9/027 | 280/32.5 |
| 6,536,733 B1 * | 3/2003 | Sharp | A45B 11/00 | 248/519 |
| 6,550,791 B2 * | 4/2003 | Ramsey | A01K 97/22 | 280/47.19 |
| 6,554,012 B2 * | 4/2003 | Patarra | A45B 3/00 | 135/16 |
| 6,648,349 B1 * | 11/2003 | Waller | B62B 3/02 | 280/47.35 |
| 6,679,245 B1 * | 1/2004 | Lu | A47J 37/0704 | 126/25 R |
| 6,726,227 B2 * | 4/2004 | Morgan | A47F 5/108 | 280/47.26 |
| 6,755,428 B2 * | 6/2004 | Butler | A45C 9/00 | 224/547 |
| 6,792,935 B2 * | 9/2004 | Williams | A47J 37/0763 | 126/25 R |
| 6,910,475 B2 * | 6/2005 | Zelek | A47J 37/0704 | 126/25 R |
| 6,993,931 B1 * | 2/2006 | Hamilton | A45B 23/00 | 62/371 |
| 7,143,601 B1 * | 12/2006 | Jimenez | F25D 23/12 | 62/457.7 |
| 7,204,509 B1 * | 4/2007 | Vanderminden | A47B 31/00 | 280/47.12 |
| 7,210,545 B1 * | 5/2007 | Waid | B60K 7/0007 | 180/19.1 |
| 7,306,243 B2 * | 12/2007 | Van Horn | A45C 7/0022 | 280/30 |
| 7,334,802 B2 * | 2/2008 | Kaplan | A45C 9/00 | 108/14 |
| 7,384,051 B1 * | 6/2008 | Haire | A01K 97/05 | 280/47.34 |
| D604,108 S * | 11/2009 | Paslawski | D7/332 | |
| 8,069,939 B1 * | 12/2011 | Metzler | B62B 3/02 | 180/19.1 |
| D651,859 S * | 1/2012 | Blake | D7/605 | |
| 8,181,811 B1 * | 5/2012 | Blake | A45B 23/00 | 220/475 |
| 8,191,907 B2 * | 6/2012 | Watson | B62B 3/007 | 280/30 |
| 8,387,610 B1 * | 3/2013 | Candelaria, Jr. | B60N 3/16 | 126/25 R |
| 9,032,949 B2 * | 5/2015 | Nilssen, II | A47J 37/0786 | 126/25 R |
| 9,101,206 B1 * | 8/2015 | Chen | B62B 3/007 | |
| 9,146,051 B2 * | 9/2015 | Kamin | F25D 23/00 | |
| 9,150,235 B2 * | 10/2015 | Galante | B62B 1/12 | |
| 9,187,108 B2 * | 11/2015 | Bruno | B62B 1/208 | |
| 9,226,614 B2 * | 1/2016 | Lin | A47J 37/0763 | |
| 9,282,797 B1 * | 3/2016 | Soto | A45C 11/20 | |
| 9,505,421 B2 * | 11/2016 | Bruno | B62B 1/208 | |
| 9,616,910 B2 * | 4/2017 | Chaloux | A45C 11/20 | |
| 2004/0112361 A1 * | 6/2004 | Zelek | A47J 37/0704 | 126/25 R |

* cited by examiner

GRILL AND COOLER SYSTEM AND METHOD OF USE

BACKGROUND

1. Field of the Invention

The present invention relates generally to a grill and cooler system and methods of use. More specifically, the invention is related to a system and method utilizing a grill attached to a cooler, wherein the cooler acts as a weight to secure the grill while still functioning as an accessible cooler.

2. Description of Related Art

Systems and methods for grills and coolers are well known in the art. Oftentimes, a grill is built as a stationary grill into an outdoor patio set up having a stand integrated into a concrete foundation. Other grills are configured as standalone structures having their own base making the grill somewhat portable. Coolers are insulated containers that allow for a user store food items in a temperature controlled environment.

One of the problems commonly associated with the above process is the limited use. Grills that have integrated bases in a patio or outdoor configuration are not portable, and thus must be used in the location in which it is built. Other grills having their own stand are portable, but are still heavy and the user still must bring the other equipment and food items, usually in a cooler, necessary to utilize the grill.

Although great strides have been made in the area of grill systems and methods of use, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
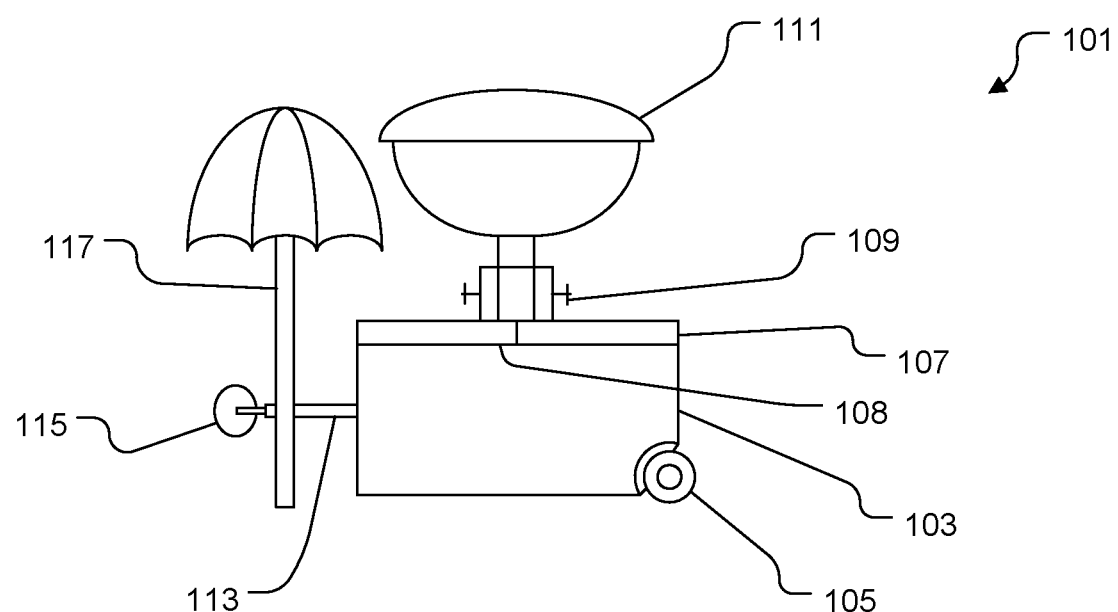
FIG. 1 is a simplified schematic of a system and method of the present invention in accordance with the preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods for coolers and grills. Specifically, the present invention is contemplated as a cooler configured as a grill stand. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 3:
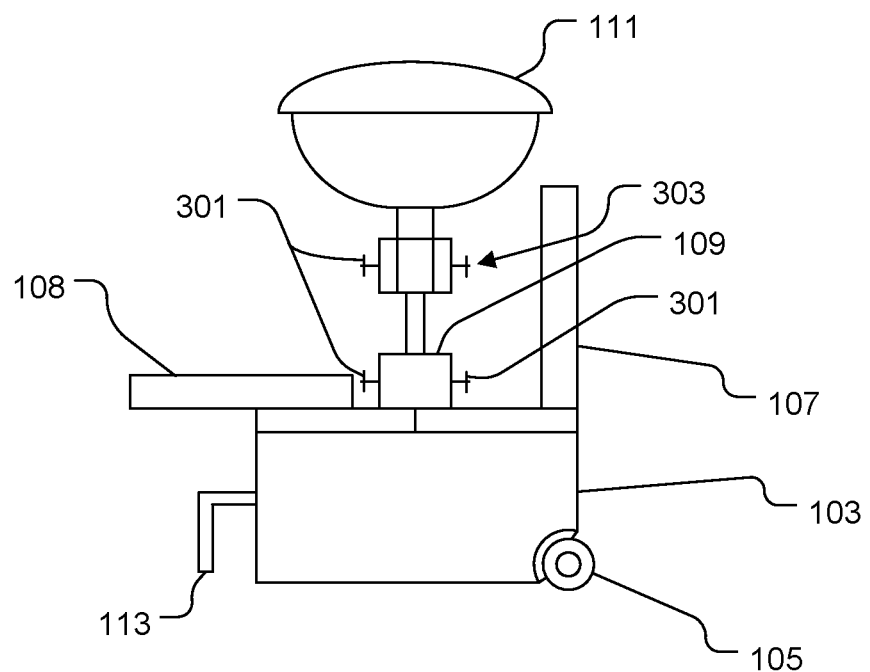
FIG. 3 is a side view of the grill and cooler of the system of FIG. 1.

Referring now to the drawings wherein like reference characters identify corresponding or similar elements throughout the several views, FIGS. 1 and 3 depict various views of a system 101 and method of use in accordance with a preferred embodiment of the present application. It will be appreciated that system 101 overcomes one or more of the above-listed problems commonly associated with the conventional systems and methods to remove hair.

Referring now to FIG. 1, system 101 is shown having a cooler 103, a grill 111, a paper towel roll 115, and an umbrella 117. The cooler 103 is shown having at least one wheel 105 and a handle 113 configured such that a user may pull on the handle to allow the cooler 103 to be rolled on the wheel or wheels 105. The cooler is also shown having a two part lid system 107, 108 and an adjustable stand 109 configured to allow a user to position vertically the grill 111. The handle 113 is configured as a paper towel roll holder and as a base for the umbrella.

Figure 2:
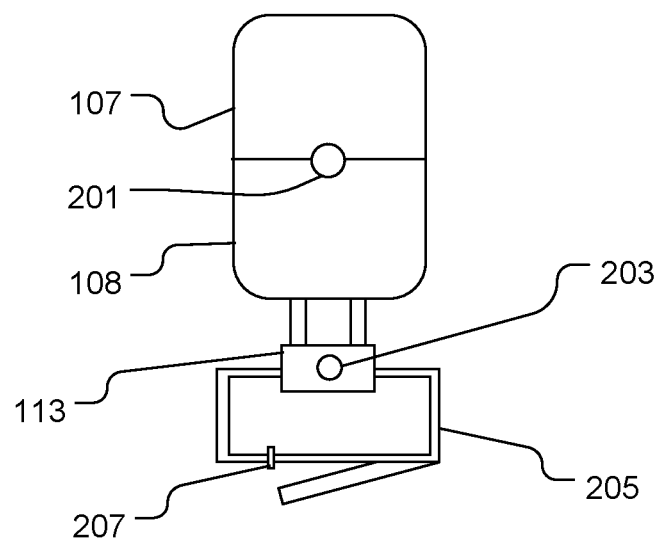
FIG. 2 is a top view of the cooler of the system of FIG. 1.

Referring now to FIG. 2, a top view of the cooler 103 of the system of FIG. 1 is shown having the two part lid system 107 and 108 wherein the two part lid system is configured as two separately moveable pieces. The lids 107 and 108 share an adjacent edge, with each lid 107 having a semi-circle cut-out wherein when the lids 107 and 108 are closed together, the semi-circle cut outs form a circular aperture 201. The circular aperture 201 is configured to allow an adjustable stand to be placed through the lid into the cooler 103. The adjustable stand may be configured as a grill stand.

The handle 113 is shown having an umbrella base portion having a circular aperture 203 configured to allow an umbrella stand to be placed through the aperture and be stabilized by the handle 113 and the cooler 103. The handle 113 is also shown having a paper towel holder portion 205 wherein a rod may be disconnected and reconnected via a connector 207 to allow for the placement or removal of a paper towel roll.

Referring now to FIG. 3, a side view of the grill and cooler of the system of FIG. 1 is shown wherein the cooler 103 is open and accessible while acting as the grill base. Lid 108 is configured to slide horizontally toward the handle 113 to expose an inner cavity of the cooler. Lid 107 is configured to rotate radially upward to expose the inner cavity of the cooler. The cooler 103 is shown having an inner stand 109 or pole holder with adjustable knobs 301 that may be tightened to stabilize a rod or pole placed into the adjustable stand 109. The grill 111 is shown having an adjustable attachment 303 with adjustable knobs 301 that are configured to allow the attachment to be secured onto a pole or rod or stand. The handle 113 is shown in a storage position.

Figure 4:
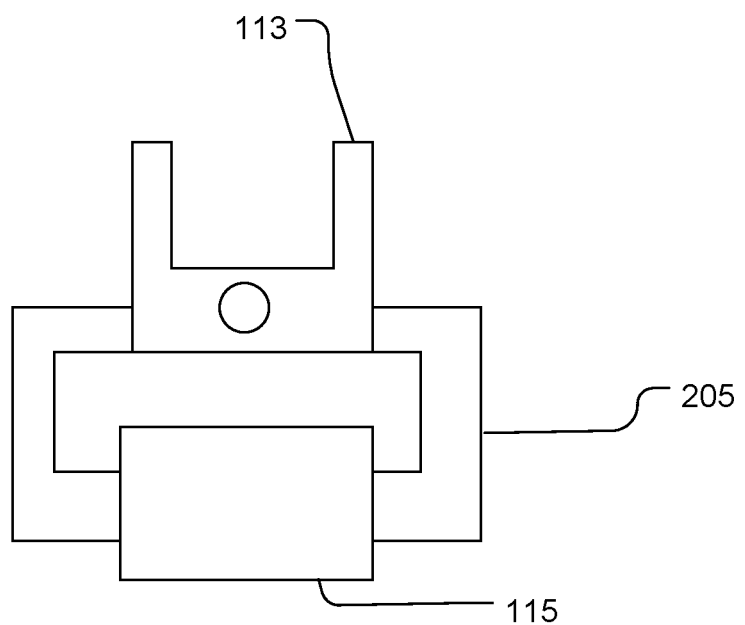
FIG. 4 is a top view of the handle of the grill of the system of FIG. 1.

Referring now to FIG. 4, a top view of the handle 113 is shown with a paper towel roll 115 disposed on the paper towel holder portion 205 of the handle 113.

The combined beverage and food cooler and barbeque grill makes this self contained unit easy to transport for tail-gating, camping, day trips, and boating. Because of it's unique design, the cooler and the grill may be used simultaneously. The grill height is adjustable via the adjustable stand and two sets of adjustable knobs or fasteners.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A cooler and grill system comprising:
    the cooler, having:
        a plurality of integral, insulated walls forming a partially enclosed inner cavity;
        a stand base attached to a bottom surface of the inner cavity;
        a pole having a first end and a second end, the second end is secured to the stand base;
        a lid having a first lid and a second lid configured to cover an opening to the inner cavity; and
        a lid aperture located in the lid such that a first portion of the lid aperture is cut out of the first lid and a second portion of the lid aperture is cut out of the second lid, the lid aperture configured to allow the pole inserted into the stand base to protrude vertically past the height of the lid;
        wherein the pole is secured to the stand positioned within the inner cavity and extends through the lid via the lid aperture;
    a grill secured to the first end of the pole and positioned above the lid aperture of the cooler via the pole;
    a handle extending from an outer surface of the cooler;
    an umbrella aperture extending through a thickness of the handle;
    an umbrella removably secured to the umbrella aperture;
    wherein the cooler stabilizes the grill; and
    wherein the cooler and grill are moveable together.

2. The system of claim 1, wherein the stand base is configured as an adjustable stand base and further comprising:
    an elongated tube having a first distal end attached to the bottom surface of the inner cavity and a second distal end being open;
    a set of adjustable fasteners;
    wherein a pole may be placed inside the tube via the second distal end; and
    wherein the adjustable fasteners may be used to tighten and secure the pole inside the elongated tube of the stand base.

3. The system of claim 1, further comprising:
    a handle located on an outer surface of one of the plurality of walls, the handle having at least one of the following:
    an umbrella anchor; and
    a paper towel roll holder.

4. The system of claim 1, further comprising a plurality of wheels to facilitate portable transport of the cooler and grill system.

5. The cooler system of claim 1, wherein the lid further comprises:
    the first lid is configured to slide horizontally to uncover a first portion of the opening to the inner cavity; and
    the second lid is configured to rotate radially upward to uncover a second portion of the opening to the inner cavity;
    wherein the first and second lids allow for the simultaneously use of the cooler and the grill.

6. The cooler and grill system of claim 1, wherein the grill further comprises:
    an attachment configured to secure the grill to the pole; and
    a set of fasteners located on an outer surface of the attachment wherein the fasteners may be tightened to further secure the grill to the pole via the attachment.

* * * * *